United States Patent [19]

Light et al.

[11] 4,017,977
[45] Apr. 19, 1977

[54] TRAILER HITCH ALIGNMENT DEVICE

[76] Inventors: Glenn M. Light, 15051 Clark Circle, Irvine, Calif. 92705; Michael V. Richardi, 6561 Britain St., Long Beach, Calif. 90808

[22] Filed: Aug. 27, 1975

[21] Appl. No.: 607,991

[52] U.S. Cl. .............................. 33/1 LE; 33/193; 33/264
[51] Int. Cl.² ...................... B60Q 1/00; G01B 7/28
[58] Field of Search .......... 33/1 M, 1 LE, 264, 193; 280/477

[56] References Cited

UNITED STATES PATENTS

| | | | |
|---|---|---|---|
| 2,396,453 | 3/1946 | Windle | 33/1 LE |
| 2,451,244 | 10/1948 | Scott et al. | 33/1 LE |
| 3,248,794 | 5/1966 | Corry | 33/193 X |
| 3,731,274 | 5/1973 | Green | 280/477 X |
| 3,734,539 | 5/1973 | Salmi | 33/264 X |
| 3,832,781 | 9/1974 | Flagge | 33/1 M X |

*Primary Examiner*—William D. Martin, Jr.
*Attorney, Agent, or Firm*—William C. Babcock

[57] ABSTRACT

A trailer hitch alignment device adapted to be releasably mounted to the draw bar of an automobile including a spring loaded spool from which a cable is played out to be turned around a guide pulley into a tubular guide. The tubular guide is pivotally mounted to align with the cable, concurrently articulating the wiper of a potentiometer. The potentiometer is connected to a meter inside the automobile, providing a visual indication of the angle of departure of the cable. Thus, by stretching the cable to connect to the hitch of a trailer, a remote indication on the meter will indicate the necessary direction of advancement of the automobile in order to effect alignment for coupling.

12 Claims, 5 Drawing Figures

TRAILER HITCH ALIGNMENT DEVICE

BACKGROUND OF THE INVENTION

1. Field of the Invention

The present invention relates to indicating devices and more particularly to an indicating device displayed in an automobile, indicating to the driver the direction of motion to align the automobile with a trailer hitch.

2. Description of the Prior Art

The use of trailers to expand the capacity of an automobile has gained wide acceptance amongst the public. One of the difficulties in using a trailer is during coupling, when close alignment of the automobile relative the trailer has to be made. This alignment is made by backing up the automobile towards the trailer until the draw bar aligns with the trailer hitch. The location of the draw bar, however, is typically obscured from view by the trunk of the automobile and the hitch alignment is therefore similarly obscured during the last stages of approach. Thus, the driver either has to seek assistance from another person to guide him into alignment, or has to make repeated tries until eventually a successful alignment is made.

Typically, a trailer is provided with a tongue extending from the frame thereof which terminates in a hitch adapted to engage a ball attached to the draw bar which, in turn, is mounted to the frame of the automobile. When heavy loads are coupled it is this alignment of the ball relative to the hitch that requires a close match-up. Because of the usual frame attachment, however, the ball itself is not visible to the driver.

In the past there have been many devices developed to assist the driver in this alignment. Most often such devices are in the form of mirrors which provide the driver with direct view of the ball. The use of mirrors, however, reverses the viewing orientation with the result that the driver becomes disoriented or has to learn new habits of response. Alternatively there have been devices developed which, by way of feelers, provide to the driven an indication of the proximity of the hitch. Again, such feelers only provide a coarse indication and only at a limited point in the approach. Thus, outside of the range of the feelers the driver has no indication at all and again has to rely on third party assistance or on repeated tries.

SUMMARY OF THE INVENTION

Accordingly, it is the general purpose and object of the present invention to provide a trailer hitch alignment device which, by way of an instrument on the dashboard of an automobile, indicates the disposition of the hitch with respect to the automobile.

Other objects of the invention are to provide a trailer hitch alignment device which can be selectively installed to be thus rendered useful during those times when solo connections are attempted.

Further objects of the invention are to provide a trailer hitch alignment device which is easy to produce, requires few parts and therefore is reliable in use.

These and othere objects are accomplished according to the present invention by attaching to the underside of the draw bar a mounting fixture which is adapted to engage the inventive alignment device. The alignment device itself includes a housing having disposed on the interior thereof a spring-loaded spool for storing thereon a length of flexible cable. The cable is drawn from the spool around a guide pulley to pass through the interior of a pivoted tubular guide to be connected to a remotely positioned trailer hitch. The guide concurrently articulates by the rotation thereof the wiper of a potentiometer. The wiper of the potentiometer is, in turn, electrically connected to a battery with the potientiometer winding itself connected to a meter disposed on the dashboard of the automobile. The meter is conventionally calibrated to a central position when the guide is aligned directly aft of the automobile. Thus, as the wiper is displaced from this position, the meter concurrently swings left or right in response thereto indicating the left or right articulation of the guide and thereby indicating the necessary direction of approach in order to make a successful connection.

More specifically, the spool wound cable is first withdrawn and attached to the remotely positioned hitch. As the automobile approaches the hitch, the cable is automatically taken up. To reduce the amount of force necessary in withdrawing the cable during this operation the spring loaded spool includes a spring wind-up device whereby, during withdrawal, low spring levels can be set in and by subsequent wind-up higher string levels can be developed during the approach. Once a successful engagement is made the inventive alignment device can then be removed from the draw bar and conveniently stored in the automobile for future use.

DESCRIPTION OF THE SPECIFIC EMBODIMENT

While the use of the presently disclosed alignment device is particularly suited for the engagement of a trailer to an automobile, other uses therefor are possible. No intent is therefore expressed by the selection of the following example, it being understood that those skilled in the art may find other uses and applications for the invention disclosed than those presently contemplated.

Figure 1:
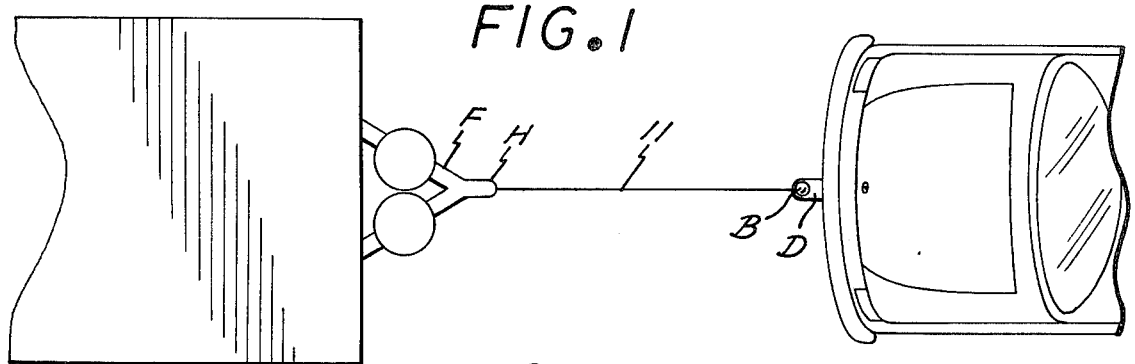
FIG. 1 is a plan view illustrating the use of the present invention during the alignment approach of an automobile relative a trailer.

As shown in FIG. 1 a conventional trailer T includes, at one end thereof, a tongue frame F terminating at the free end in a conventional ball-engaging hitch H. Connected between the hitch H and a draw bar D on the rear of an automobile is a flexible cable 11 useful with the present invention. Hitch H is adapted to connect to the draw bar D by the conventional ball-hitch connection, draw bar D being provided with the necessary ball shown as ball B thereon. As will be appreciated from this figure the angle of departure of cable 11 from the end of drawbar D will indicate the misalignment of the ball B thereon with respect to the hitch H. It is this angle of departure that is usefully applied in the invention disclosed herein.

Figure 2:
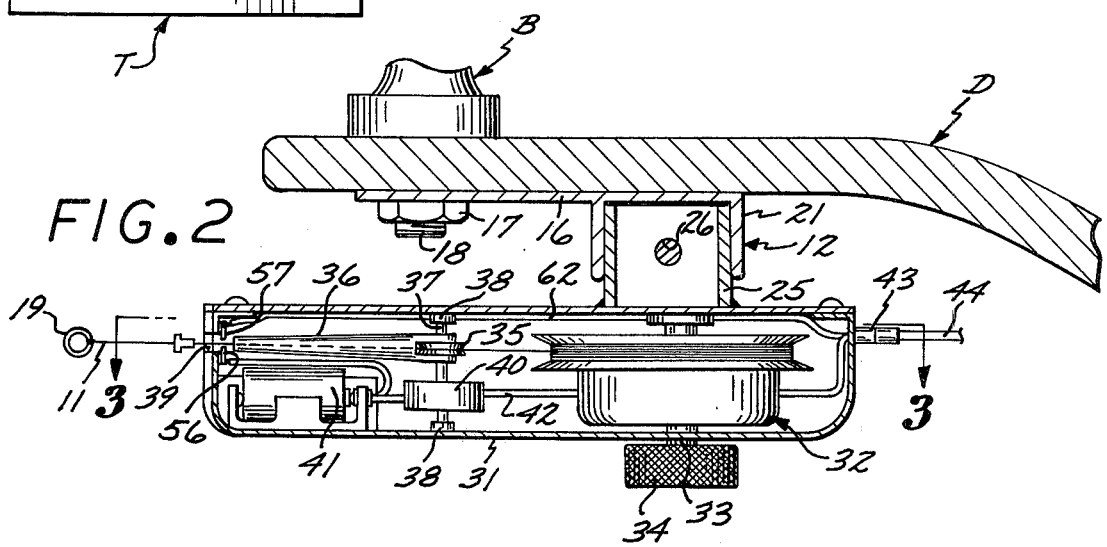
FIG. 2 is a side view, in partial cross section, illustrating the detail construction of the inventive alignment device.

More specifically, as shown in FIG. 2, mounted on the underside of the drawbar D, by common engagement with a mounting stud 18 extending from the ball B, is a mounting fixture, generally designated by the numeral 12. Releasably secured to fixture 12 is the inventive alignment device generally designated by the numeral 10. In more detail, mounting fixture 12 comprises a strap 16 secured between the drawbar D and a nut 17 which also engages the threaded shaft or stud 18 extending from the underside of the ball. Formed distal of this connection, on the underside of strap 16 is a receiving bracket 21 aligned downwardly from the drawbar to attach to a correspondingly formed engagement fitting 25 formed on the upper surface of the alignment device 10. To effect a secure attachment of fitting 25 within bracket 21 there is further provided a common bore 26 in the walls thereof which is adapted to receive a securing pin to be described in more detail hereinbelow.

By continued reference to FIG. 2 the alignment device 10 includes a thin walled casing or housing 31 having disposed on the interior thereof a spring loaded spool 32 for playing out the cable 11. Spool 32 is transversely mounted within housing 31, extending to the exterior thereof a spring wind-up shaft 33 which terminates in wind-up knob 34 for manually controlling the spring tension in the spool. Cable 11, as it is played out from the spring loaded spool 32, is directed to pass around a free rolling guide pulley 35 to be thus directed into the interior bore of a tubular guide 36. Guide 36 is mounted for pivotal motion at one end thereof on a shaft 37 which also supports pulley 35 in rotation. Shaft 37 is secured in a conventional manner at both ends thereof in opposed end plates 38 formed on the interior of housing 31. In order to reduce the effects of misalignment, the central axis of shaft 37 is substantially coincident with the central axis of stud 18, to thereby correspond with the substantial center of ball B. Thus the pivotal motion of guide 36 is essentially fixed relative ball B and the angle of departure developed thereby will therefore indicate the angle of approach necessary to align the ball beneath the hitch.

To accommodate this varying angle of departure there is formed in the exterior surface of housing 31, a transverse slot 39 in alignment with the motion plane of the free end of guide 36. Cable 11, as it emerges from guide 36, is passed through the slot 39 to connect to the hitch. To provide for convenient manner of securing cable 11 to the hitch and to concurrently prevent the wind-up and inadvertent loss of the cable on spool 32, there is formed on the free end of the cable an oversize ring 19. By way of this ring the cable is secured to the hitch and as the automobile is advanced towards the trailer, the resulting slack is taken up by the spool. The direction of the necessary motion of the drawbar towards the hitch is therefore indicated by the angular orientation of guide 36.

This remote angular orientation is transformed into an electrical signal by a potentiometer 40 which is connected for common articulation with the guide. Potentiometer 40 is connected between a battery 41 and an output lead 42 which passes to the exterior of housing 31 to terminate in a releasable connection 43 which, in turn, connects to yet another cable 44 routed through the automobile to a dial indicator to be described in more detail hereinbelow.

Figure 3:
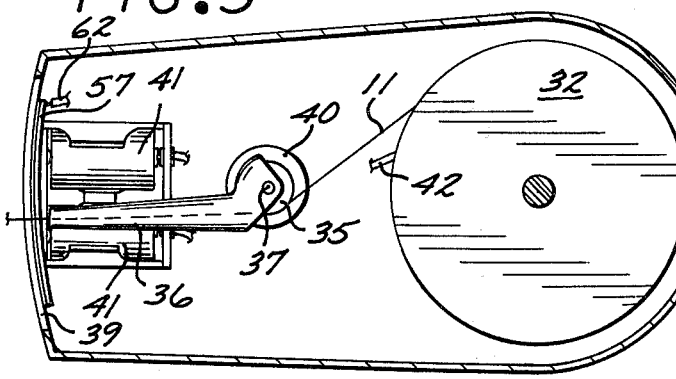
FIG. 3 is a plan view, in section, taken along line 3—3 of FIG. 2.

As shown in FIG. 3 the spring-loaded take-up spool 32 is substantially larger than the guide pulley 35. Accordingly, cable 11, withdrawn from spool 32, will therefore approach pulley 35 at a substantial angle relative the departure orientation thereof. The pivoted end of guide 36, in turn, eccentrically disposed relative the axis of shaft 37 to align the central opening thereof in a tangential alignment with pulley 35. The spring-loading of the take-up spool 32 and the limits on the angular motion of guide 36 will therefore constantly maintain cable 11 in guiding relationship within the peripheral groove of pulley 35. In this manner a maintenance free arrangement of parts is achieved as long as some spring tension is maintained on the cable.

Figure 4:
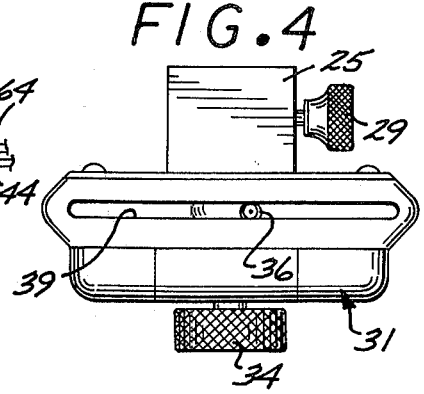
FIG. 4 is an end view of the inventive alignment device shown in FIG. 2.

To fix the angular orientation of the inventive alignment device 10 relative the draw bar D and therefore relative the automobile, the engagement of fitting 25 within bracket 21 is secured by a pin 29 as illustrated in FIG. 4. It is intended that fitting 25 be inserted within bracket 21 with the bore 26 in alignment. Once so positioned, pin 29 inserted into bores 26 will secure the alignment device 10 with respect to the drawbar. In this position the angular orientation of guide 36 is brought out by way of the potentiometer 40 and lead 44 into the automobile.

As shown further in FIG. 4, the plane of motion of the ends of guide 36 is in alignment with the slot 39. Thus cable 11, as it emerges from the guide, is unencumbered, directly indicating the angular relationship of the automobile relative the trailer hitch. As the cable 11 is taken up with the concurrent advancement of the automobile any misalignment of the drawbar D with respect to the hitch will result in progressively larger angular displacement of the guide. Consequently, the effective error gain or amplification will increase with the approach of the automobile. Thus, where precise final maneuvering is required toward the end of the approach any deviations from proper alignment are highly amplified. This feature is conveniently available from the combination of parts described herein which, by virtue of their arrangement, provide the equivalent of gain shaping normally achieved with highly complicated systems.

In order to provide for a remote indication of the separating distance of the ball relative the hitch, a circuit completion device is included on the cable 11. Specifically, by reference back to FIGS. 2 and 3, disposed on the interior of housing 31 along the edges of slot 39 are two conductor strips 56 and 57, both separated from the housing by an insulating film 58. Strip 56 is connected to the positive side of the battery 41 while strip 57 is connected by way of a lead 62 disposed to emerge along lead 42, connecting across yet another connector 63, to a lead 64 routed to a display in the automobile. A friction engaged conductive collar 60 is selectively disposed along cable 11 to complete the circuit between strips 56 and 57 when a determined length of the cable is withdrawn into the interior of the housing. Thus any manner of cable connection can be accommodated by sliding manipulation of collar 60 to align with the ball receiving part of the hitch.

Figure 5:
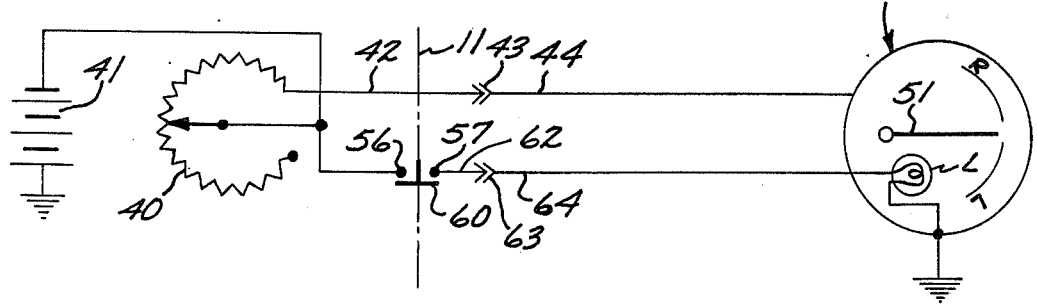
FIG. 5 is a circuit schematic useful with the inventive alignment device disclosed herein.

As shown in FIG. 5 the circuit schematic including potentiometer 40 provides a battery 41 connected to the potentiometer wiper. The winding of potentiometer 40 is, in turn, floated at one end and connected at the other end to a meter 50. Meter 50 can be any ammeter or galvanometer selected to complement the impedance of the potentiometer. By selection of the meter impedence (or by including a series impedance in the lead 44), it is possible for one skilled in the art to align the needle 51 of meter 50 in a central position when the angle of departure of cable 11, and therefore the alignment of the wiper of a potentiometer 40, is directly aft of the automobile. The resulting motion of the wiper will therefore concurrently articulate needle 51 in a corresponding direction, indicated as directions R and L thereon, indicating the direction of misalignment. The driver, therefore, by viewing the meter 50 can conveniently align the automobile with the ball B on the hitch H at which point engagement can be effected.

Once the driver advances the automobile into alignment with the hitch, collar 60 completes the circuit between strips 56 and 57 to excite a lamp L in the meter 50. At this point a substantially aligned relationship between the ball and the hitch is achieved and manual coupling can then take place.

Some of the many advantages of the present invention should now be readily apparent. The invention provides, by way of conventional parts, a device which presents to the driver an indication of misalignment during the coupling maneuver. This the invention provides with a minimum of parts and in a geometric arrangement which produces eye response levels as the approach distance to coupling decreases.

Obviously many modifications and variations to the above disclosure can be made without departing from the spirit of the invention. It is therefore intended that the scope of the invention be determined solely dependent on the claims hereto.

We claim:

1. A trailer alignment device for use in coupling a hitch to a drawbar, comprising:
    a housing adapted for attachment to said drawbar;
    a spring loaded spool mounted in said housing having the axis of rotation thereof aligned substantially along in vertical direction;
    a guide roller mounted for rotation along an axis substantially parallel to the axis of rotation of said spool and in substantial alignment with the point of connection between said hitch and drawbar;
    a tubular guide pivotally mounted in said housing about the axis of said roller;
    a flexible cable stored on said spool and aligned to pass over a peripheral section of said roller and through said guide;
    a potentiometer mounted for articulation by said tubular guide; and
    meter means connected to said potentiometer for providing an indication of the displacement thereof.

2. Apparatus according to claim 1 wherein:
    said spool includes a manually adjustable knob for selectively adjusting the spring tension therein.

3. Apparatus according to claim 2 wherein:
    said tubular guide includes a central opening therein eccentrically disposed relative the axis of rotation of said roller to align along a tangent relative the periphery thereof.

4. Apparatus according to claim 3 wherein:
    said housing includes a transverse slot formed in substantial alignment with the plane of pivotal motion of said guide.

5. Apparatus for providing a remote indication of the angular alignment of one vehicle relative another, comprising:
    a housing adapted for attachment to said one vehicle;
    a flexible cable having one end thereof selectively secured to said other vehicle;
    spring loaded spool means mounted in said housing for securing the other end of said cable and storing a segment thereof;
    guide means pivotally mounted proximate the point of angular motion between said vehicles in said housing for alignment along said cable; and
    signaling means connected to said guide means for providing a remote indication of the pivotal alignment thereof.

6. Apparatus according to claim 5 further comprising:
    roller means mounted for rotation about the pivotal axis of said guide means for directing said cable into said guide means.

7. Apparatus according to claim 6 wherein:
    said guide means includes a tubular element having the central opening thereof aligned along a tangent relative said roller means.

8. Apparatus according to claim 7 wherein:
    said signaling means includes a potentiometer mounted for articulation by said guide means and a meter disposed in said one vehicle adapted to indicate the articulation of said potentiometer.

9. Apparatus according to claim 5 wherein:
    said spool means includes a spool for storing said cable, spring means for urging said spool in rotation and manual control means connected to said spring means for controlling the urging force of said spring means.

10. Apparatus according to claim 5 further comprising:
    circuit completion means selectively disposed along said cable for providing a remote indication of the length of said cable segment stored on said spool means.

11. Apparatus according to claim 10 wherein:
    said circuit completion means includes a slidably secured conductive collar disposed on said cable and two ends of an indicating circuit disposed to engage said collar.

12. Apparatus according to claim 11 wherein:
    said indicating circuit includes a lamp.

* * * * *